United States Patent
Kromer et al.

(10) Patent No.: US 12,497,816 B2
(45) Date of Patent: Dec. 16, 2025

(54) DRIVE DEVICE FOR ADJUSTING A VEHICLE ASSEMBLY

(71) Applicant: Brose Fahrzeugteile SE & Co. Kommanditgesellschaft, Bamberg, Bamberg (DE)

(72) Inventors: Alex Kromer, Stegaurach (DE); Marvin Hohlfeld, Hirschaid (DE); Maximilian Kunzelmann, Bamberg (DE); Heino Schalyo, Altendorf (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 390 days.

(21) Appl. No.: 17/632,530

(22) PCT Filed: Aug. 5, 2020

(86) PCT No.: PCT/EP2020/071982
§ 371 (c)(1),
(2) Date: Feb. 3, 2022

(87) PCT Pub. No.: WO2021/023766
PCT Pub. Date: Feb. 11, 2021

(65) Prior Publication Data
US 2022/0290483 A1    Sep. 15, 2022

(30) Foreign Application Priority Data

Aug. 5, 2019  (DE) .................. 10 2019 211 717.1

(51) Int. Cl.
*E05F 15/00* (2015.01)
*E05F 15/611* (2015.01)
(Continued)

(52) U.S. Cl.
CPC .......... *E05F 15/659* (2015.01); *E05F 15/611* (2015.01); *E05F 15/75* (2015.01);
(Continued)

(58) Field of Classification Search
CPC ....... E05F 15/659; E05F 15/611; E05F 15/75; E05Y 2201/21; E05Y 2400/31; E05Y 2400/36; E05Y 2900/531
(Continued)

(56) References Cited

U.S. PATENT DOCUMENTS

| | | | |
|---|---|---|---|
| 2013/0154532 A1* | 6/2013 | Otte | H02P 7/29 318/466 |
| 2015/0275563 A1* | 10/2015 | Fujimoto | E05F 15/60 16/71 |
| 2016/0087565 A1* | 3/2016 | Watanabe | H02P 7/29 318/503 |

FOREIGN PATENT DOCUMENTS

| | | |
|---|---|---|
| DE | 19927871 A1 | 11/1999 |
| DE | 10117935 A1 | 10/2002 |

(Continued)

OTHER PUBLICATIONS

Norm DIN ISO 8855 2013-11-00. Straßenfahrzeuge—Fahrzeugdynamik und Fahrverhalten—Begriff (ISO 8855:2011) (Road vehicles—Vehicle dynamics and road-holding ability—Vocabulary). 51.

*Primary Examiner* — Tiffany P Young
(74) *Attorney, Agent, or Firm* — Dickinson Wright PLLC (57) ABSTRACT

A drive device for adjusting a vehicle assembly an electromotive adjustment drive for adjusting the vehicle assembly and a control device for controlling the adjustment drive the control device actuates the adjustment drive in an automatic mode for adjusting the vehicle assembly with a predetermined rotational speed and in a servo mode for providing a supporting force during a manual adjustment of the vehicle (Continued)

assembly by a user. The control device includes a speed regulation module for determining a first setpoint current value in dependence on a rotational speed of the adjustment drive, a servo regulation module for determining a second setpoint current value in dependence on a load acting on the vehicle assembly and a current regulation module for regulating a current of the adjustment drive.

10 Claims, 3 Drawing Sheets

(51) Int. Cl.
 *E05F 15/659* (2015.01)
 *E05F 15/75* (2015.01)
(52) U.S. Cl.
 CPC ....... *E05Y 2201/21* (2013.01); *E05Y 2400/31* (2013.01); *E05Y 2400/36* (2013.01); *E05Y 2400/44* (2013.01); *E05Y 2400/446* (2024.05); *E05Y 2800/30* (2024.05); *E05Y 2900/531* (2013.01)

(58) Field of Classification Search
 USPC .......................................................... 701/49
 See application file for complete search history.

(56) References Cited

FOREIGN PATENT DOCUMENTS

| | | |
|---|---|---|
| DE | 102004052590 A1 | 5/2006 |
| DE | 202007002404 U1 | 11/2007 |
| DE | 102013201436 A1 | 7/2014 |
| DE | 102014225150 A1 | 6/2016 |
| DE | 102015215627 A1 | 2/2017 |
| DE | 102017111138 A1 | 11/2017 |
| DE | 102016216673 A1 | 3/2018 |
| DE | 102017115024 A1 | 1/2019 |
| DE | 102017118894 A1 | 2/2019 |
| DE | 102017218288 A1 | 4/2019 |
| DE | 102017223762 A1 | 6/2019 |
| JP | 2000356069 A | 12/2000 |
| WO | 2017083706 A1 | 5/2017 |
| WO | 2017211567 A1 | 12/2017 |

\* cited by examiner

DRIVE DEVICE FOR ADJUSTING A VEHICLE ASSEMBLY

CROSS-REFERENCE TO RELATED APPLICATIONS

This application is the U.S. National Phase of PCT Application No. PCT/EP2020/071982 filed on Aug. 5, 2020, which claims priority to German Patent Application No. DE 10 2019 211 717.1, filed on Aug. 5, 2019, the disclosures of which are hereby incorporated in their entirety by reference herein.

TECHNICAL FIELD

This present disclosure relates to a drive device for adjusting a vehicle assembly.

BACKGROUND

Drive devices may include an electromotive adjustment drive for adjusting the vehicle assembly and a control device for controlling the adjustment drive. The control device is configured to actuate the adjustment drive in an automatic mode for adjusting the vehicle assembly with a predetermined rotational speed and in a servo mode for providing a supporting force during a manual adjustment of the vehicle assembly by a user.

Such a vehicle assembly for example can be a door or flap on a motor vehicle. A door can be formed for example by a vehicle side door pivotally arranged on a vehicle body or also by a liftgate or a sliding door. However, the vehicle assembly can also be a sliding roof, for example.

Usually, in an automatic mode, liftgates for example nowadays are electromotively traversed between defined positions, for example between an open position and a closed position. In a liftgate, but also for example, in a vehicle side door, it may be desirable that in addition to an automatic, electromotive adjustment a manual adjustment is also possible, which however is supported by an electric motor. This is referred to as a servo mode.

In such a servo mode it is desirable that the force to be applied by a user remains at least approximately the same over an adjustment path of the vehicle assembly, and thus it is possible for a user to adjust the vehicle assembly for example between an open position and a closed position, smoothly, comfortably and in a haptically pleasant way by applying an approximately uniform user force.

It should be possible to provide a servo mode at low cost, such as without the use of an additional, expensive sensor system for measuring the force actually applied by a user or also by a drive.

SUMMARY

One or more objects of the present disclosure may be to provide a drive device for adjusting a vehicle assembly, which in a simple way to be implemented at low cost provides for the provision of an automatic mode and a servo mode for the automatic and electromotively supported adjustment of a vehicle assembly.

Accordingly, the control device may include a speed regulation module for determining a first setpoint current value in dependence on a rotational speed of the adjustment drive, a servo regulation module for determining a second setpoint current value in dependence on a load acting on the vehicle assembly and a current regulation module for regulating a current of the adjustment drive. The current regulation module may be configured to regulate the current of the adjustment drive in the automatic mode with reference to the first setpoint current value supplied by the speed regulation module and in the servo mode with reference to the second setpoint current value supplied by the servo regulation module.

The drive device can be operated in an automatic mode for the automatic adjustment of the vehicle assembly, for example of a vehicle side door or a liftgate, or in a servo mode for the manual, but electromotively supported adjustment of the vehicle assembly. In the automatic mode, the vehicle assembly is adjusted in a regulated way with a predetermined rotational speed. In the servo mode, on the other hand, the adjustment drive is controlled such that the adjustment drive provides a supporting force for a manual adjustment of the vehicle assembly, and the force to be applied by a user possibly is the same over the adjustment path or a part of the adjustment path of the vehicle assembly or follows a desired curve.

For operating the drive device in the different operating modes, different regulation modules may be provided.

A speed regulation module serves to specify a first setpoint current value for a current regulation module so that in the automatic mode a current regulation is effected with reference to the setpoint current value provided by the speed regulation module and set with reference to the desired rotational speed. Thus, in the automatic mode a regulation in the manner of a cascade regulation is used, in which the speed regulation module supplies a correcting value in the form of a setpoint current value to the downstream current regulation module, and in the automatic mode the current regulation module performs a regulation with reference to the setpoint current value supplied by the speed regulation module.

In the servo mode, on the other hand, a current regulation is effected, and a setpoint current value generated by the servo regulation module is supplied to the current regulation module, and the current regulation is effected in the current regulation module with reference to the setpoint current value received from the current regulation module. The servo regulation module is adapted to set the setpoint current value such that the force provided by the adjustment drive supports the user in the movement of the vehicle assembly in such a way that the force to be applied by the user possibly is at least approximately the same (or follows a desired curve), and thus a comfortable, haptically pleasant adjustment of the vehicle assembly is obtained for the user.

In one embodiment, the control device includes a switching device that can be switched between a first switching position and a second switching position, and in the first switching position the speed regulation module is connected to the current regulation module and in the second switching position the servo regulation module is connected to the current regulation module. Thus, via the switching device it is possible to switch between the automatic mode and the servo mode. In the first switching position the first setpoint current value, which is generated by the speed regulation module, is supplied to the current regulation module. In the second switching position, on the other hand, the second setpoint current value generated by the servo regulation module is supplied to the current regulation module.

The switching device can be a physical switch. In terms of software, however, the switching device can also be implemented in the control device and realize the supply of the respective setpoint current value to the current regulation module in terms of software.

In one embodiment, the speed regulation module is configured to set the first setpoint current value with reference to a speed setpoint value and the rotational speed of the adjustment drive. The speed setpoint value for example can be firmly stored in the control device and indicates the value with which an adjustment is to be effected in the automatic mode. In the speed regulation module, a regulation is effected with reference to the speed setpoint value and the resulting actual speed of the adjustment drive, so that the setpoint current value provided by the speed regulation module is adapted and set such that the actual rotational speed of the adjustment drive is regulated to the speed setpoint value.

The rotational speed of the adjustment drive for example can be detected sensorially, for example by using Hall sensors that sensorially detect a rotation of a motor shaft of the adjustment drive.

In one embodiment, the control device additionally includes a load calculation module preceding the servo regulation module, which serves to determine a load acting on the vehicle assembly. The load is a load acting on the vehicle assembly independently of an applied user force, which may counteract an adjustment of the vehicle assembly (or possibly can also support the movement of the vehicle assembly) and for example can depend on the vehicle position, an angle of a hinge axis of the vehicle assembly configured as a vehicle door, and on a current adjustment position of the vehicle assembly.

The load calculation module, as an example, can be adapted to determine a static and/or dynamic load acting on the vehicle door. The load can be determined for example in dependence on an inclination angle of the vehicle measured about a longitudinal vehicle axis, an inclination angle of a hinge axis of the vehicle assembly (which in this case is configured for example as a vehicle side door pivotally arranged on a vehicle body) measured about the longitudinal vehicle axis, a slope angle of the vehicle measured about a transverse vehicle axis, a slope angle of the hinge axis of the vehicle assembly measured about the transverse vehicle axis and/or an opening angle of the vehicle assembly.

In dependence on the inclination of the vehicle and the inclination of the hinge axis of the vehicle assembly (measured about the longitudinal vehicle axis, also referred to as roll angle) and/or in dependence on the slope of the vehicle and the slope of the hinge axis (measured about the transverse vehicle axis, also referred to as pitch angle), forces of gravity act on the vehicle assembly, for example on a vehicle side door pivotally arranged on the vehicle body. Such forces of gravity can act for example in the direction of a closed position of a vehicle door and thus counteract for example an opening of the vehicle door. Thus, on opening of the vehicle door, a user must work against a torque acting on the vehicle assembly due to gravity, and the supporting force provided by the adjustment drive is to be set such that the force to be applied by the user remains the same independently of the position of the vehicle and the position of the vehicle assembly or follows a desired curve. The supporting force to be provided by the adjustment drive thus changes with the vehicle position and the position of the vehicle assembly and correspondingly is specified such that an at least approximately constant adjusting force is obtained for a user in the servo mode.

In addition, friction forces can act on the vehicle assembly, which likewise can be employed by the load calculation module for calculating the load acting on the vehicle assembly.

Additionally or alternatively, other forces can also be included, such as wind forces acting on the vehicle assembly.

In one embodiment, the servo regulation module is configured to use a load acting on the vehicle assembly, as it is calculated by the load calculation module and supplied to the servo regulation module, and in addition a target force value to be applied by a user, in order to determine a setpoint torque to be provided by the adjustment drive. The target force value corresponds to the desired force which a user has to apply on adjustment of the vehicle assembly. The setpoint current value is to be specified by the servo regulation module for a current regulation such that the adjustment drive provides a torque that supports the user on adjustment of the vehicle assembly in such a way that the user at least approximately only has to apply a force corresponding to the target force value.

The load that is calculated by the load calculation module can have a static component and a dynamic component. The load can be determined with reference to a static hinge moment acting about a hinge axis of the vehicle assembly and a dynamic hinge moment acting about the hinge axis of the vehicle assembly. The static hinge moment can be obtained from moment components resulting from the action of gravity on the vehicle assembly in dependence on the inclination angle and the slope angle of the vehicle and the hinge axis, and in addition from a friction moment acting on the hinge axis. The dynamic hinge moment, on the other hand, can result from inertial forces, for example, and thus is a measure of the inertia of the vehicle door and of a door acceleration.

When the static hinge moment and the dynamic hinge moment are known, the setpoint torque to be provided by the adjustment drive can be calculated with reference to a torque balance to be $$M_{setpoint\_hinge} = M_{hinge\_stat} + M_{hinge\_dyn} - M_{user},$$

wherein $M_{setpoint\_hinge}$ indicates the setpoint torque, $M_{hinge\_stat}$ indicates the static hinge moment, $M_{hinge\_dyn}$ indicates the dynamic hinge moment and $M_{user}$ indicates the user moment. The static hinge moment and the dynamic hinge moment here have a positive effect on the torque balance. The user moment to be applied by a user on the other hand has a positive or negative effect on the balance depending on the direction of movement. The setpoint torque indicates the torque to be provided by the adjustment drive, which corresponds to the total torque required for adjusting the vehicle assembly minus the user moment.

With reference to the setpoint torque the servo regulation module then, in one embodiment, determines the second setpoint current value and in the servo mode supplies this setpoint current value to the current regulation module. In the current regulation module, a current regulation then is effected with reference to the setpoint current value provided by the servo regulation module.

In one embodiment, the current regulation module is configured to set the current of the adjustment drive by using a pulse width modulation. In the current regulation module, a current regulation is effected with reference to the respectively supplied setpoint current value dependent on the operating mode. The current regulation module here outputs a correcting variable with reference to which the voltage supplied to the adjustment drive is set by using a pulse width modulation of high frequency, for example with a frequency between 5 kHz and 100 kHz or even higher.

In the current regulation module, a regulation is effected with reference to the respectively supplied setpoint current value and the resulting, actual motor current. The current of the adjustment drive thus is set by regulation such that it corresponds to the setpoint current value.

Due to the electromotive support of the manual adjustment of the vehicle assembly in the servo operating mode by current regulation, the force to be applied by a user can be set to a desired target force value, and the regulation can be effected in such a way that the force to be applied by the user remains at least approximately the same over the adjustment path of the vehicle assembly or follows a desired curve. Thus, a manual adjustment of the vehicle assembly by a user in the servo operating mode can be effected easily, comfortably and in a haptically pleasant way.

In the servo operating mode, the provision of the supporting force here follows the movement of a user, such as, an undesired run-on, i.e. a further adjustment after termination of a user actuation, can be avoided. The user is free to choose the adjustment speed. The adjustment drive merely provides a supporting force that is variably set by a user in dependence on the adjusting movement of the vehicle assembly.

Due to the regulation method, it is easily possible to switch between the servo operating mode and the automatic operating mode, and vice versa.

BRIEF DESCRIPTION OF THE DRAWINGS

The idea underlying the invention will be explained in detail below with reference to the exemplary embodiments illustrated in the Figures. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A door drive device for adjusting a vehicle side door is known for example from DE 10 2015 215 627 A1 and for example includes an adjustment drive which via a transmission element in the form of a traction cable is coupled with an adjustment part in the form of a catch strap articulated to the vehicle body. By adjusting a cable drum coupled with the transmission element, the vehicle side door can be pivoted relative to the vehicle body, and the door drive device includes a coupling which provides for a manual adjustment of the vehicle side door independently of the adjustment drive.

Figure 1:
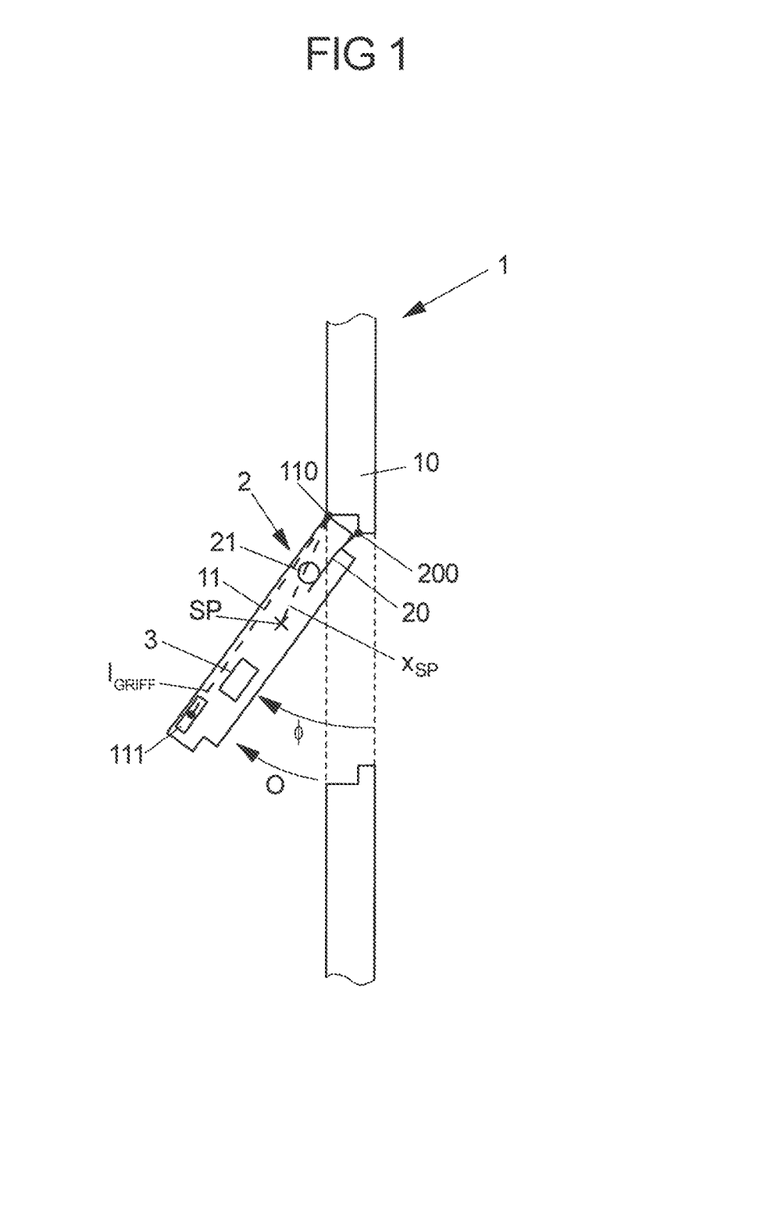
FIG. 1 shows a schematic view of a vehicle assembly in the form of a vehicle side door.

FIG. 1 shows a schematic view of a vehicle assembly 11 in the form of a vehicle side door arranged on a vehicle body 10 of a motor vehicle 1, which is pivotable relative to the vehicle body 10 about a hinge axis 110 and can be pivoted between a closed position and an open position along an opening direction O.

A drive device 2, which is configured for example in the manner of the door drive described in DE 10 2015 215 627 A1, serves for electromotively adjusting the vehicle assembly 11 and includes an adjustment drive 21 which for example is stationarily arranged on the vehicle assembly 11, for example on a door module enclosed in a door interior space of the vehicle assembly 11 in the form of the vehicle side door, and is operatively connected to an adjustment part 20 for example in the form of a catch strap articulated to the vehicle body 10 at a joint axis 200.

For example, the adjustment drive 21 can include a cable drum that is coupled with a traction cable arranged on the adjustment part 20 in such a way that by rotating the cable drum the adjustment part 20 is moved relative to the adjustment drive 21 and the vehicle assembly 11 thereby can be pivoted relative to the vehicle body 10 about the hinge axis 110, as this is described in DE 10 2015 215 627 A1. However, other mechanisms are also conceivable and possible for a drive device 2, which provide for an electromotive adjustment of the vehicle assembly 11 with respect to a vehicle body 10.

At this point reference should also be made to the fact that a drive device 2 of the type described in this text is not limited to the use on a vehicle side door, but generally can be employed for adjusting a vehicle assembly, for example a vehicle door in the form of a swing door or sliding door, for adjusting a liftgate or also for adjusting a sliding roof.

The drive device 2 will enable an automatic mode and a servo mode and thus can effect an automatic adjustment of the vehicle assembly 11 or a manual adjustment of the vehicle assembly 11 by a user, which however is electromotively supported by the drive device 2. The drive device 2 therefor can be switched between different operating modes, and the adjustment drive 21 is controlled in a different way in dependence on the respectively set operating mode.

While in the automatic mode a regulation will be effected to a predetermined rotational speed in order to move the vehicle assembly 11 between different positions, for example a closed position and an open position, with a predetermined adjustment speed, a torque will be provided by the adjustment drive 21 in the servo mode, which torque effects that a user force to be additionally applied by a user effects an adjustment of the vehicle assembly 11. The user force to be applied by the user here will be at least approximately the same over the adjustment path of the vehicle assembly 11, i.e. in the example of FIG. 1 over the adjustment angle $\phi$ between the closed position and a completely open position, or follow a desired curve, in order to provide a comfortable, haptically pleasant adjustment for the user.

Figure 2A:
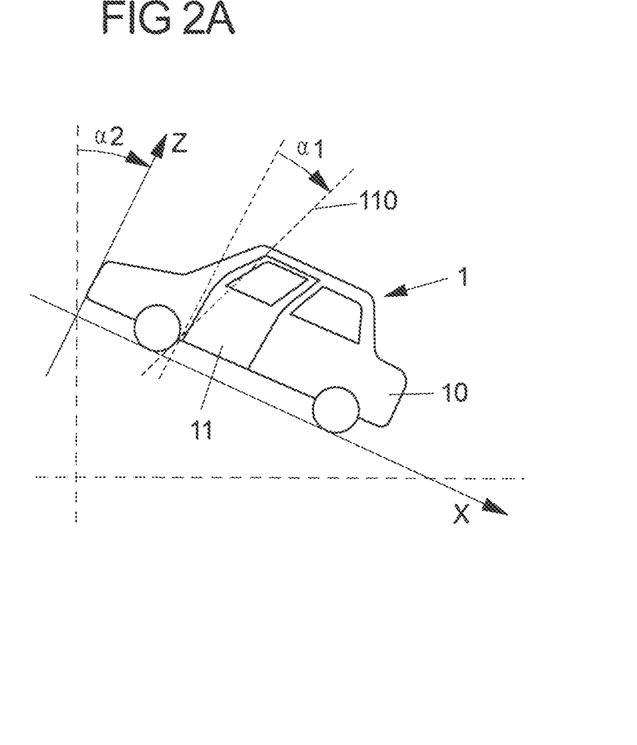
FIG. 2A shows a view for illustrating a slope angle of a vehicle and a slope angle of a hinge axis of a vehicle side door.
Figure 2B:
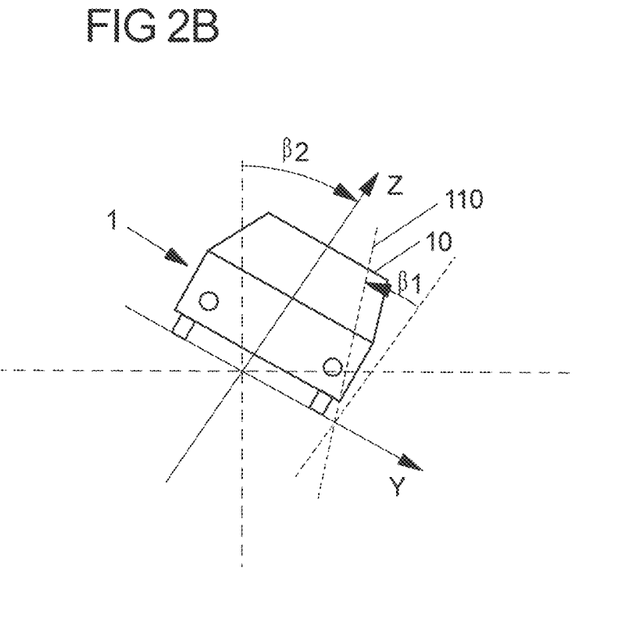
FIG. 2B shows a view for illustrating an inclination angle of a vehicle and an inclination angle of a hinge axis of a vehicle side door.

FIGS. 2A and 2B (in representations exaggerated for illustration) show different vehicle positions and resulting positions of the hinge axis 110 of a vehicle assembly 11 in the form of a vehicle side door pivotally arranged on the vehicle body 10.

FIG. 2A shows a vehicle 1 which for example is parked on a slope with a gradient and correspondingly has a slope angle $\alpha 2$ between the vertical vehicle axis Z and a vertical (determined by the direction of gravity). In addition, the hinge axis 110 of the vehicle assembly 11 has a slope angle α1 relative to the vertical vehicle axis Z. The slope angle α2 of the vehicle 1 and the slope angle α1 of the hinge axis 110 relative to the vertical axis Z are measured about the transverse vehicle axis Y (see FIG. 2B).

FIG. 2B on the other hand shows a vehicle 1 that is inclined about the longitudinal vehicle axis X (see FIG. 2A). The vertical vehicle axis Z in this case has an inclination angle β2 relative to the vertical. In addition, the hinge axis 110 can have an inclination angle β1 relative to the vertical vehicle axis Z.

As will be explained below, the vehicle position is included in the calculation of the torque to be provided by the adjustment drive 21 in the servo operating mode, which torque will support a user during an adjustment of the vehicle assembly 11.

Figure 3:
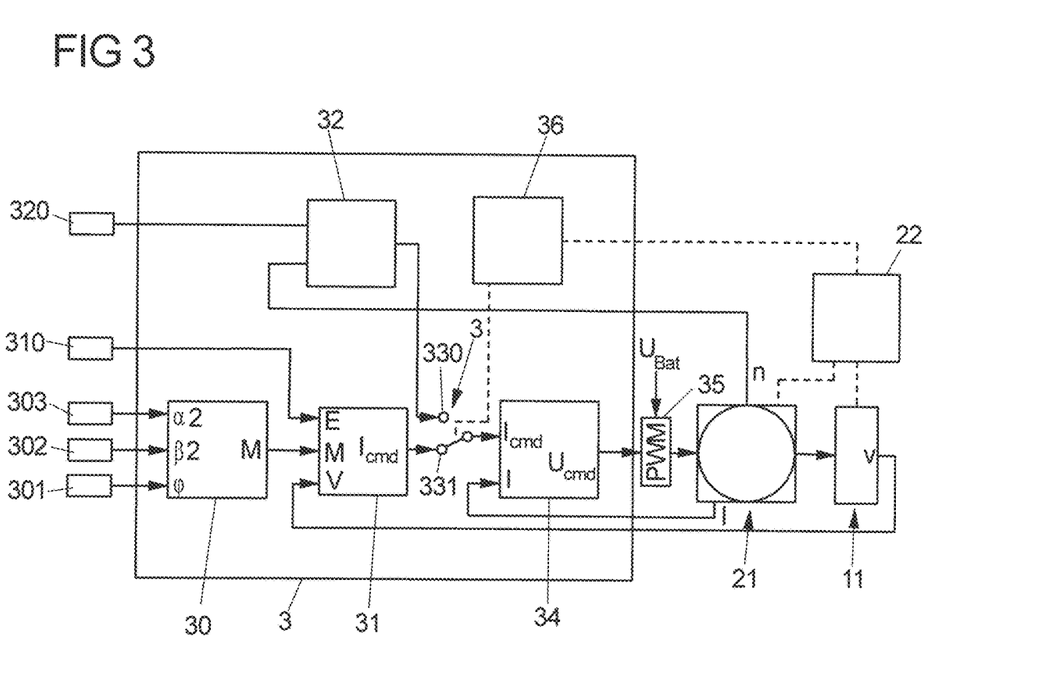
FIG. 3 shows a functional view of a control device of a drive device.

A control device 3, such as a controller, for controlling the adjustment drive 21 of the drive device 2, which is shown in FIG. 3 in an exemplary embodiment, includes different regulation modules which depending on the operating mode serve to set a current (corresponding to the motor current) of the adjustment drive 21 configured as an electric motor such that an adjustment of the vehicle assembly 11 is effected in a desired way depending on the operating mode, namely in the automatic mode with a desired adjustment speed and in the servo mode in a power-assisted way.

The control device 3 implements a current regulation module 34 to which a setpoint current value $I_{cmd}$ is supplied, and depending on the operating mode the current regulation module 34 receives the setpoint current value $I_{cmd}$ from a speed regulation module 32 or a servo regulation module 31.

The speed regulation module 32 here serves to specify the setpoint current value $I_{cmd}$ in the automatic mode such that a desired speed is obtained at the adjustment drive 21 and correspondingly a desired adjustment speed v is obtained at the vehicle assembly 11.

The servo regulation module 31 on the other hand serves to specify the setpoint current value $I_{cmd}$ such that a manual adjustment of the vehicle assembly 11 in the servo mode is supported with a torque that is set such that the force to be additionally applied by a user is at least approximately the same over the adjustment path of the vehicle assembly 11 or follows a desired curve.

In the automatic mode, the speed regulation module 32 regulates the rotational speed of the adjustment drive 21. To the speed regulation module 32 a setpoint speed $n_{cmd}$ is supplied via an input 320, and the setpoint speed $n_{cmd}$ for example is stored in a memory and thus is firmly specified (as a constant value or as a speed profile over the adjustment path), but possibly can also be adapted by a user. Depending on the setpoint speed naiad and the rotational speed actually obtained at the adjustment drive 21 in the regulation mode, the speed regulation module 32 determines a setpoint current value $I_{cmd}$ which it supplies to the current regulation module 34.

In the automatic mode, the speed regulation module 32 is connected to the current regulation module 34 via a switching device 33 by switching the switching device 33 onto a switching point 330. The setpoint current value $I_{cmd}$ output by the speed regulation module 32 thus is supplied to the current regulation module 34 so that the current regulation module 34 can perform a current regulation with reference to the setpoint current value $I_{cmd}$ received from the speed regulation module 32.

The switching device 33 can be physically implemented by a mechanical switch. In terms of software, however, the switching device 33 advantageously is implemented by the software of the control device 3. Likewise, the modules of the control device 3 may be implemented by software modules.

The control of the switching device 33 for example is effected via a control module 36 of the control device 3.

In the current regulation module 34 a current regulation is effected. The current regulation module 34 regulates the current of the adjustment drive 21 in such a way that it is 34 set to the setpoint current value supplied to the current regulation module 34. The current regulation module 34 sets the current by using a voltage correcting value $U_{cmd}$ in the form of a load factor (between 0% and 100%) in that the voltage correcting value $U_{cmd}$ is supplied to a pulse width modulation 35 which with reference to the battery voltage $U_{bat}$ of the vehicle and the voltage correcting value $U_{cmd}$ generates an output voltage and supplies the same to the adjustment drive 21. The pulse width modulation 35 may operate with a comparatively high frequency, for example, with a frequency between 5 kHz and 30 kHz, for example 20 kHz. With reference to the setpoint current value $I_{cmd}$ and the actually resulting current I of the actuating drive 21, the correcting value $U_{cmd}$ is set such that the motor current I is regulated to the setpoint current value $I_{cmd}$.

In the automatic mode, a regulation thus is effected in the manner of a cascade regulation in which the speed regulation module 32 determines a correcting value in the form of a setpoint current value $I_{cmd}$ and supplies the same to the downstream current regulation module 34 for current regulation.

By switching the switching device 33 onto the switching point 331, it is possible to switch into the servo mode, in which a setpoint current value $I_{cmd}$ now is supplied to the current regulation module 34 from the servo regulation module 31, but not from the speed regulation module 32. With reference to the setpoint current value received from the servo regulation module 31, a current regulation then is effected in such a way that the torque provided by the adjustment drive 21 supports a user in the adjustment of the vehicle assembly 11 and the user may have to apply a user force largely uniform over the adjustment path of the vehicle assembly 11 for the electromotively supported adjustment of the vehicle assembly 11.

The determination of the setpoint current value $I_{cmd}$ by the servo regulation module 31 is effected in dependence on a load acting on the vehicle assembly 11, which is calculated by a load calculation module 30 in dependence on the vehicle position and an opening position (indicated by the opening angle φ) of the vehicle assembly 11.

The load acting on the vehicle assembly 11 is determined from a static torque and a dynamic torque that acts about the hinge axis 110.

A static torque acting on the vehicle assembly 11, as an example, is determined with reference to a moment obtained due to the gravity about the hinge axis 110 and in addition with reference to a friction moment acting in the hinge of the vehicle assembly 11. The static torque, referred to as static hinge moment, thus is $$M_{hinge,stat} = M_{inclination} * \cos(\alpha) 30 \, M_{inclination} \pm M_{R,hinge},$$

wherein $M_{hinge,stat}$ indicates the static hinge moment, $M_{inclination}$ indicates an inclination moment $M_{inclination}$ obtained due to a vehicle inclination and an inclination of the hinge axis 110, $M_{slope}$ indicates a slope moment obtained due to a vehicle slope and a slope of the hinge axis 110, and $M_{R,hing}$ indicates a friction moment at the hinge.

It should be noted here that the term "cos(α)" in the above equation only is present when the inclination/slope angles are determined according to DIN ISO 8855 (corresponding to the Euler angle, which results from a roll angle, pitch angle and yaw angle). When the inclination angle (absolute) is measured, the term "cos(α)" will be omitted.

The slope moment and the inclination moment are calculated as follows:

$$M_{inclination} = x_{SP} * m * g * \sin(\alpha) * \sin(\varphi)$$

$$M_{inclination} = x_{SP} * m * g * \sin(\beta) * \cos(\varphi)$$

$$\alpha = \alpha_1 + \alpha_2$$

$$\beta = \beta_1 + \beta_2$$

The quantities used in these equations here represent:
$\varphi$ Current door opening angle [°]—offset angle
$x_{SP}$ Distance door center of gravity—hinge axis [m]
m Door mass [kg]
g Gravitational acceleration [m/s²]
$\alpha_1$ Slope of hinge axis [°]
$\beta_2$ Inclination of hinge axis [°]
$\alpha_2$ Slope of hinge axis [°]
$\beta_2$ Inclination of hinge axis [°]
$M_{R,hinge}$ Friction moment of hinge [Nm]

The angles α1, α2, β1, β2 are illustrated in FIGS. 2A and 2B. The distance XSP between the door center of gravity SP and the hinge axis 110 is also indicated in FIG. 1. The slope of the vehicle 1 and the inclination of the vehicle 1 as well as the current position of the vehicle assembly 11 can be sensorially detected by sensors 301, 302, 303 and, correspondingly, measured values are supplied to the load calculation module 30.

The offset angle takes account of the center of gravity of the vehicle door in the transverse direction of the vehicle (Y-direction).

In addition to the static hinge moment, a dynamic hinge moment acts on movement of the vehicle assembly 11, which is calculated as follows:

$$M_{hinge,dyn} = \ddot{\varphi} * I * c$$

$\ddot{\varphi}$ here designates the acceleration of the vehicle assembly 11. The acceleration of the vehicle assembly 11 can be determined from a change of the adjustment angle $\varphi$. Alternatively, however, the acceleration can also be calculated from the adjustment speed v of the vehicle assembly 11, which in operation is supplied to the servo regulation module 31.

In the above equation, I represents the inertia of the vehicle assembly 11. The factor c enables the adjustment of a dynamic haptics and can assume values between 0% and 100%. When c=100%, a change in dynamics during acceleration of the vehicle assembly 11 is compensated substantially motorically. When c=0%, a user himself must apply a change in force during an acceleration.

In addition to such static and dynamic load forces, a torque is obtained at the vehicle assembly 11, which is caused by the user force. The user torque here is $$M_{user} = F_{user} * l_{handle}$$

with
$F_{user}$ Desired operating force [N]
$l_{handle}$ Distance handle position—hinge axis [m]
$M_{user}$ User-generated moment [Nm]

The distance $l_{handle}$ between the handle position of a handle 111 at the vehicle assembly 11 and the hinge axis 110 is schematically shown in FIG. 1.

With reference to the static hinge moment, the dynamic hinge moment and the user torque, a moment balance can be drawn up in order to determine a setpoint hinge moment to be provided by the adjustment drive 21. The moment balance here is as follows:

$$M_{setpoint\_hinge} = M_{hinge\_stat} + M_{hinge\_dyn} - M_{user}$$

$M_{setpoint\_hinge}$ designates the torque to be provided by the drive device 2 at the hinge axis 110. Therefrom, the servo regulation module 31 calculates the torque to be provided by the adjustment drive 21 by taking account of a gear ratio of the drive device 2 to obtain $$M_{setpoint\_drive} = M_{setpoint\_hinge} * gr_{lever}$$

$gr_{lever}$ designates the gear ratio of the kinematics of the drive device 2 for translating an adjusting force provided by the door drive device 2 between the vehicle assembly 11 and the vehicle body 10 at the site of the adjustment drive 21 into an adjusting force at the site of the hinge axis 110. $gr_{lever}$ is dependent on $\varphi$, and the dependency is stored in the system for example in the form of a look-up table.

The setpoint moment of the motor is calculated from the setpoint torque of the drive by taking account of the motor efficiency and a gear ratio of a motor transmission to obtain $$M_{setpoint\_motor} = \frac{M_{setpoint\_drive}}{\eta_{motor} * gr_{transmission}}$$

with
$\eta_{motor}$ Gear ratio efficiency [ ]
$gr_{transmission}$ Transmission gear ratio [ ]

The motor current in principle is proportional to the motor torque so that the setpoint current value can be calculated from the setpoint motor torque $M_{setpoint\_motor}$ as follows:

$$I_{setpoint\_motor} = \frac{M_{setpoint\_motor}}{Kt} + I_o$$

with
Kt Motor constant [Nm/A]
$I_o$ Motor idling current [A]

This value is supplied as setpoint current value $I_{cmd}$ from the servo regulation module 31 to the current regulation module 34 in the servo operating mode.

Figure 4:
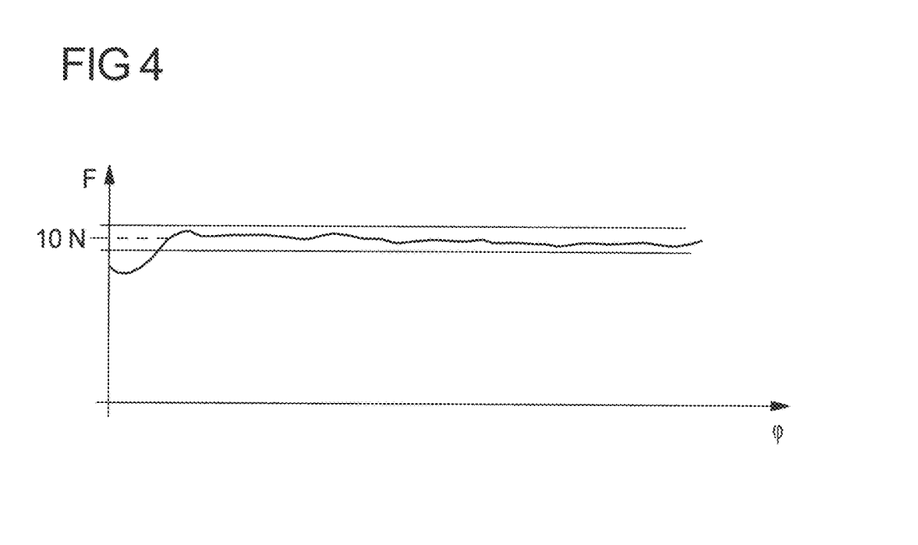
FIG. 4 shows a graphical view of an adjusting force to be applied by a user over an adjustment path of a vehicle side door in a servo operating mode.

In the servo operating mode, the setpoint current value $I_{cmd}$ thus is determined by taking account of load forces acting on the vehicle assembly 11 in such a way that a force to be applied by the user is the same over the adjustment path of the vehicle assembly 11 or follows a desired curve. Correspondingly, as is shown in FIG. 4, for example an at least approximately uniform user force F is obtained over the adjustment path of the vehicle assembly 11 (in FIG. 4 plotted over the adjustment angle $\varphi$), which for example can be set at 10 N. Thus, a user touching the door handle 111 must apply a regulated, uniform user force of for example 10 N over the adjustment path of the vehicle assembly 11 in order to effect a smooth, electromotively supported adjustment of the vehicle assembly 11.

The idea underlying the invention is not limited to the exemplary embodiments described above, but can also be realized in a different way.

A drive device as described here can be used for adjusting a vehicle side door that is pivotally arranged on a vehicle body about a hinge axis. Likewise, a drive device can, however, also be employed for a sliding door, a liftgate or a sliding roof by applying the same control principles.

In an automatic mode, a speed-controlled adjustment of a vehicle assembly can be effected via a drive device. In a servo mode, on the other hand, power assistance is provided in such a way that a user can effect an adjustment with a uniform user force or with a user force following a desired curve over the adjustment path of the vehicle assembly, and thus the adjustment is comfortable and pleasant for a user.

In the drive device, it is easily possible to switch between an automatic mode and a servo mode.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 motor vehicle
10 vehicle body
11 vehicle assembly (vehicle door)
110 hinge axis
111 handle
2 drive device
20 adjustment part (catch strap)
200 joint axis
21 adjustment drive
3 control device
30 load calculation module
301-303 sensor device
31 servo regulation module
310 event detection
32 speed regulation module
320 speed input
33 switching device
330, 331 switching point
34 current regulation module
35 PWM unit
36 control module
α1 slope angle of the hinge axis
α2 vehicle slope angle
β1 inclination angle of the hinge axis
β2 vehicle inclination angle
φ door opening angle
$I_{cmd}$ setpoint current value
n speed
O opening direction
SP door center of gravity
$U_{bat}$ battery voltage
$x_{SP}$ distance pivot axis—door center of gravity
X longitudinal vehicle axis
Y transverse vehicle axis
Z vertical vehicle axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive device for adjusting a vehicle assembly, the drive device including an electromotive adjustment drive, configured to adjust the vehicle assembly, the drive device comprising:
a control device for controlling operation of the adjustment drive, the control device being configured to:
control the adjustment drive in an automatic mode to move the vehicle assembly with a predetermined rotational speed, and
control the adjustment drive in a servo mode to output a supporting force for supporting a manual movement of the vehicle assembly by a user;
wherein the control device is configured to:
determine a first setpoint current value based on a rotational speed of the adjustment drive;
determine a second setpoint current value based on a load acting on the vehicle assembly; and
regulate a current of the adjustment drive based on the first setpoint current value in response to the adjustment drive being in the automatic mode, and to regulate the current of the adjustment drive based on the second setpoint current value in response to the adjustment drive being in the servo mode;
wherein the control device is further configured to;
set the first setpoint current value based on a speed setpoint value and the actual rotational speed of the adjustment drive;
determine a setpoint torque to be output by the adjustment drive based on a load acting on the vehicle assembly and a target force value to be applied by the user, wherein the load acting on the vehicle assembly is determined by comparing a static hinge moment acting about a hinge axis of the vehicle assembly resulting from gravity and a dynamic hinge moment acting about the hinge axis of the vehicle assembly resulting from an inertia of the vehicle door and by computing the setpoint torque using, as input values, the static hinge moment, the dynamic hinge moment and a user moment resulting from the target force value, wherein the control device is configured to determine the second setpoint current value based on the setpoint torque, and
regulate the current of the adjustment drive based on the supplied setpoint current value and a resulting actual motor current.

2. The drive device of claim 1, wherein the control device is further configured to determine a load acting on the vehicle assembly based on,
a vehicle inclination angle, measured about a longitudinal vehicle axis;
an inclination angle of a hinge axis of the vehicle assembly, measured about the longitudinal vehicle axis;
a slope angle of the vehicle, measured about a transverse vehicle axis;
a slope angle of the hinge axis of the vehicle assembly, measured about the transverse vehicle axis; and/or
an opening angle of the vehicle assembly.

3. The drive device of claim 1, wherein the control device is further configured to determine the setpoint torque according to a torque balance of the static hinge moment, the dynamic hinge moment and a user moment resulting from the target force value, defined by:

$$M\_(setpoint\_hinge)=M\_(hinge\_stat)+M\_(hinge\_dyn)-M\_user;$$

wherein Msetpoint_hinge indicates the setpoint torque, Mhinge_stat indicates the static hinge moment, Mhinge_dyn indicates the dynamic hinge moment and Muser indicates the user moment.

4. The drive device of claim 1, wherein the control device is further configured to set the current of the adjustment drive by using a pulse width modulation.

5. A drive device configured to adjust a vehicle assembly, the drive device comprising:
an electromotive adjustment drive configured to adjust the vehicle assembly; and
a control device configured to operate in an automatic mode, in which the electromotive adjustment drive assembly moves at a predetermined rotational speed to adjust the vehicle assembly, and a servo mode, in which the electromotive adjustment drive provides a support force to the vehicle assembly during manual adjustment of the vehicle assembly,
wherein the control device is configured to:
determine a first setpoint current value based on a speed of the adjustment drive;
determine a second setpoint current value based on a load acting on the vehicle assembly;
regulate a current of the adjustment drive based on the first setpoint current value in response to the adjustment drive being in the automatic mode, and regulate the current of the adjustment drive based on the second setpoint current value in response to the adjustment drive being in the servo mode; and
set the first setpoint current value based on a speed setpoint value and the actual rotational speed of the adjustment drive;
wherein the control device is further configured to determine a setpoint torque to be output by the adjustment drive based on a load acting on the vehicle assembly and a target force value to be applied by the user, wherein the load acting on the vehicle assembly is determined by comparing a static hinge moment acting about a hinge axis of the vehicle assembly resulting from gravity and a dynamic hinge moment acting about the hinge axis of the vehicle assembly resulting from an inertia of the vehicle door and by computing the setpoint torque using, as input values, the static hinge moment, the dynamic hinge moment and a user moment resulting from the target force value, wherein the control device is configured to determine the second setpoint current value based on the setpoint torque, and
regulate the current of the adjustment drive based on the supplied setpoint current value and a resulting actual motor current.

6. A method of operating a drive device configured to adjust a vehicle assembly, the method comprising:
commanding, by a controller, an adjustment drive to operate in an automatic mode, in which adjustment drive moves at a predetermined rotational speed to adjust a position of the vehicle assembly, or in a servo mode, in which the adjustment drive provides a supporting force to the vehicle assembly as a user manually adjusts the position of the vehicle assembly;
determining, a first setpoint current value based on a rotational speed of the adjustment drive;
determining, a second setpoint current value based on a load acting on the vehicle assembly;
regulating a current of the adjustment drive based on the first setpoint current value, in response to the adjustment drive operating in the automatic mode; and
regulating the current of the adjustment drive based on the second setpoint current value, in response to the adjustment drive operating in the servo mode;
wherein the determining the first setpoint current value includes: setting the first setpoint current value based on a speed setpoint value and the actual rotational speed of the adjustment drive;
wherein the determining the second setpoint current value includes: determining a setpoint torque to be output by the adjustment drive based on a load acting on the vehicle assembly and a target force value to be applied by the user, wherein the load acting on the vehicle assembly is determined by comparing a static hinge moment acting about a hinge axis of the vehicle assembly resulting from gravity and a dynamic hinge moment acting about the hinge axis of the vehicle assembly resulting from an inertia of the vehicle door and by computing the setpoint torque using, as input values, the static hinge moment, the dynamic hinge moment and a user moment resulting from the target force value, wherein the control device is configured to determine the second setpoint current value based on the setpoint torque,
wherein the regulating includes: regulating the current of the adjustment drive based on the supplied setpoint current value and a resulting actual motor current.

7. The method of claim 6, further comprising:
setting the first setpoint current value based on a speed setpoint value and the rotational speed of the adjustment drive.

8. The method of claim 6, further comprising:
determining an inclination load acting on the vehicle assembly, wherein the inclination load is based on a vehicle inclination angle, measured with respect to a longitudinal vehicle axis.

9. The method of claim 6, wherein the regulating of the current of the adjustment drive includes altering a voltage supplied to the adjustment drive by a pulse width modulation.

10. The method of claim 9, wherein a frequency of the pulse width modulation ranges between 5 kHz and 100 kHz.

* * * * *